United States Patent
Rau et al.

(10) Patent No.: US 6,538,829 B2
(45) Date of Patent: Mar. 25, 2003

(54) OPTICAL ELEMENT MOUNT COMPRISING AN OPTICAL ELEMENT HOLDING FRAME

(75) Inventors: Johannes Rau, Gerstetten (DE); Wolfgang Hummel, Schwaebisch Gmuend (DE); Juergen Fischer, Heidenheim (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 09/930,778

(22) Filed: Aug. 14, 2001

(65) Prior Publication Data

US 2002/0067555 A1 Jun. 6, 2002

(30) Foreign Application Priority Data

Aug. 14, 2000 (DE) .......................... 100 39 712

(51) Int. Cl.[7] ................................ G02B 7/02
(52) U.S. Cl. ...................................... 359/819
(58) Field of Search .................. 359/810, 811, 359/813, 814, 819, 822, 823, 824

(56) References Cited

U.S. PATENT DOCUMENTS

| | | | | |
|---|---|---|---|---|
| 5,822,133 A | | 10/1998 | Mizuno et al. | ............. 359/696 |
| 5,986,827 A | * | 11/1999 | Hale | ........................ 359/822 |
| 6,191,898 B1 | * | 2/2001 | Trunz et al. | ................ 359/819 |
| 6,271,976 B1 | * | 8/2001 | Weber | ....................... 359/819 |
| 6,400,516 B1 | * | 6/2002 | Spinali | ....................... 359/819 |

* cited by examiner

Primary Examiner—Huy Mai
Assistant Examiner—Saeed Seyrafi
(74) Attorney, Agent, or Firm—Wells St. John P.S.

(57) ABSTRACT

An adjusting optical element mount (1) serves for the position of two components (2a, 2b) in relation to one another, in particular of two carrier elements for optical elements, such as mirrors or lenses, in particular as an axial and/or angle manipulator for lithography lenses. The components (2a, 2b) can be adjusted in relation to one another via the action of force (F, T). Each of the components (2a, 2b) has at least three hinges (4a, 4b, 4c, 4d, 5a, 5b, 5c, 5d). Each of the hinges (4a, 4b, 4c, 4d) of one component (2a) is connected in each case to a corresponding hinge (5a, 5b, 5c, 5d) of the respectively other component (2b) to form a pair of hinges (7a, 7b, 7c, 7d) via a lever element (6a, 6b, 6c, 6d) in each case. Each of the pairs of hinges (7a, 7b, 7c, 7d) is connected in each case to at least one lever (8a, 8b, 8c, 8d; 13, 13') of at least one of the adjacent pairs of hinges (7a, 7b, 7c, 7d) via the at least one lever (8a, 8b, 8c, 8d; 13, 13') and at least one further hinge (9, 9'; 9a, 9b; 9a', 9b') in each case.

21 Claims, 4 Drawing Sheets

OPTICAL ELEMENT MOUNT COMPRISING AN OPTICAL ELEMENT HOLDING FRAME

CROSS REFERENCE TO RELATED APPLICATION

This application relates to and claims priority to corresponding Germany Patent Application No. 100 39 712.3, which was filed on Aug. 14, 2000, and which is incorporated by reference herein.

BACKGROUND OF THE INVENTION

The invention relates to an optical element mount comprising an optical element holding frame and a mount stack.

U.S. Pat. No. 5,822,133 discloses a optical element mount which displaces two carrier elements for lenses axially in relation to one another along an optical axis, for improving the imaging quality in an optical lens. For this purpose, the above mentioned document uses a plurality of hydraulic actuators which can be moved predominantly via a fluid. The document describes arrangements in which it is possible to achieve small manipulations in the axial direction, the so called "Z-direction", via actuators arranged symmetrically in relation to the optical axis. For this purpose, individual configurations of the invention provide three mechanisms which are distributed symmetrically about the optical axis of the respective lenses, and each comprise an actuator which can be actuated hydraulically or piezoelectrically, and corresponding lever arrangements which may be produced from monolithically in the form of flexure hinges. This construction makes it possible to realize a Z-manipulation of the lens.

The use of three actuators requires a very high level of regulating outlay. Moreover, integrating the actuators between the two components results in the disadvantage that the overall structural unit is relatively large and, in particular in order to leave free sufficiently large central openings for the corresponding lenses, requires a very large amount of space in the axial direction and in the radial direction. As a result, it is also the case that the design will only have a low level of rigidity.

It is also known, in particular from the field of photography, to realize the axial displacement of lenses or other optical elements in relation to one another in that at least one of the carrier elements for one of the optical lenses or the like is placed in a threaded element, and it is thus possible to vary the spacings between the individual components via rotation of the individual components in relation to one another.

On account of the friction during such an adjustment of the spacing between two components in relation to one another, and a possibly occurring slip/stick effect, this type of manipulation can only be used when there is no need for any high levels of accuracy. The use of high-performance lenses, for example in the field of microlithography, is thus ruled out.

The object of the invention is to provide a optical element mount for an optical element mount comprising an optical element holding frame and a mount stack allowing with a very compact and space-saving construction, very precise adjustment of the position of the two components in relation to one another and being of very rigid configuration.

SUMMARY OF THE INVENTION

This object is achieved according to the invention by the features specified in claim 1.

Since each of the components has the at least three hinges which are connected to respectively corresponding hinges of the respectively other component via a lever element, it is possible to realize a very compact construction. Moreover, in this case, only at least six hinges and at least three lever elements are necessary in order to connect the two components in the axial direction. With an appropriate selection of the hinges, in this case it is possible to utilize, for example, very rigid solid-body hinges, this construction may be realized, on the one hand, in a very space-saving manner in the axial direction and, on the other hand, in very rigid form.

The lever elements of the pairs of hinges are connected to at least one adjacent lever of at least one of the adjacent pairs of hinges via at least one lever and at least one further hinge in each case. By virtue of this connection, the individual pairs of hinges correspond directly to one another.

For example with four pairs of hinges and the same lengths for the lever elements and the levers, as is the case, for example, with the pairs of hinges arranged in the manner of a square, in which case the further hinges are then displaced some way inward in each case in relation to the theoretical side edges of the square, it is possible to realize a very uniform movement. The optical element mount may then be activated via the at least two levers, which may be connected to one another in turn and thus provide the possibility of it being possible for the optical element mount, in a very favorable configuration, to be operated by a single actuator.

In this case, depending on the amount of space present, it is possible for the levers to project radially to the corresponding extent beyond the structural unit, with the result that, by virtue of the very long levers, even if only a comparatively small amount of force is available, very rigid configuration of the hinges, which may be realized for example as flexure hinges, is possible since the forces acting on the lever elements are correspondingly reinforced by the length of the levers. The small angle of rotation of the individual levers and lever elements thus results in very good linearity of the desired movement in conjunction with a very small lateral movement of the components, said movement being caused by the lever elements of the individual pairs of hinges.

This results in the very compact and straightforward construction which, on account of the very long levers and of the associated possibility of the corresponding hinges being of very rigid configuration, permits a very rigid configuration of the optical element mount as a whole. This, in turn, results in very advantageous properties on account of the consequently very high eigenfrequency of the optical element mount.

BRIEF DESCRIPTION OF THE DRAWINGS

Preferred embodiments of the invention are described below with reference to the following accompanying drawings.

Advantageous configurations of the optical element mount can be gathered from the subclaims and the exemplary embodiments illustrated hereinbelow with reference to the drawings, in which:

BRIEF DESCRIPTION OF THE PREFERRED EMBODIMENTS

Figure 1:
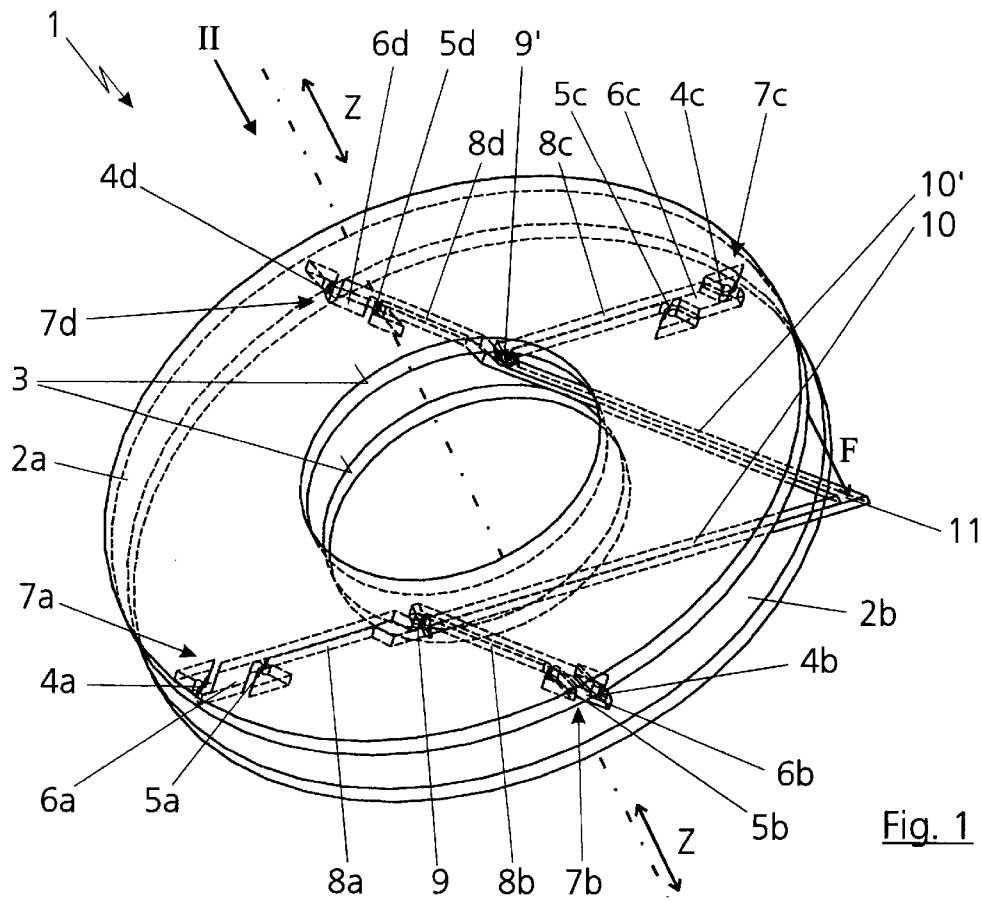
FIG. 1 shows a three-dimensional illustration of an optical element mount for adjusting the position of two components in relation to one another.

FIG. 1 shows an optical element mount 1 with means for adjusting the position of two components 2a, 2b in relation to one another. The two components may be referred to as, for example, an optical element holding frame 2a and a mount stack frame 2b, respectively. The components 2a, 2b may be carrier elements for optical arrangements, for example mirrors or lenses, or a carrier element for optical arrangements and a fixed base element. In the embodiment illustrated the components 2a, 2b each have a central bore 3. They could be intended as carrier elements for lenses.

The optical element mount 1 is intended to serve as an axial and/or angle manipulator for micro lithography lenses. It depends on the precise embodiment and on the type of force acting for adjustment purposes, in particular, as to whether the latter acts as a force or a torque, or the optical element mount serves for adjusting the axial spacing between the two components 2a, 2b, that is to say as an axial or Z manipulator, or is used as an angle manipulator or tilting-type manipulator for adjusting the angle position of the two components 2a, 2b in relation to one another. This is explained herein below in detail again.

Some embodiments have in common the fact that each of the two components 2a, 2b have in each case four hinges 4a, 4b, 4c, 4d and 5a, 5b, 5c, 5d, respectively. Each of the hinges 4a, 4b, 4c, 4d of one component 2a is connected to the respectively corresponding hinge 5a, 5b, 5c, 5d of the respectively other component 2b via a lever or lever element 6a, 6b, 6c, 6d. This combination of the respectively two hinges 4a and 5a, 4b and 5b, 4c and 5c, 4d and 5d with the respective lever element 6a, 6b, 6c, 6d produces a pair of hinges 7a, 7b, 7c, 7d in each case.

Each of these pairs of hinges 7a, 7b, 7c, 7d is connected to a respectively adjacent pair of hinges 7a, 7b, 7c, 7d via at least one lever 8a, 8b, 8c, 8d and at least one further hinge 9, 9' in each case.

The exemplary embodiment illustrated in FIG. 1 concerns an optical element mount 1 which is configured as a Z manipulator and is actuated via the action of force on the levers 8a, 8b, 8c, 8d. This force acts via two lever-like extensions 10, 10' of the levers 8a and 8d, which come together at a point of connection 11. A force F then acts at the point of connection 11 of the lever-like extensions 10, 10' and is transmitted to the levers 8a and 8d by the lever-like extensions 10, 10'. Via the further hinges 9, 9', the levers 8b, 8c also undergo movement caused by the force F. Since the levers 8a, 8b, 8c, 8d are connected in each case to the corresponding lever elements 6a, 6b, 6c, 6d, it is also the case here that the lever elements 6a, 6b, 6c, 6d are deflected by the force F. On account of the corresponding arrangement of the hinges 4a, 4b, 4c, 4d and 5a, 5b, 5c, 5d on the respective component 2a, 2b, the two components 2a, 2b then move in relation to one another.

If the lever elements 6a, 6b, 6c, 6d and, if appropriate, also the lever-like extensions 10, 10' are at least more or less of exactly the same length as one another, this gives ideal transmission ratios and, in the case of a Z manipulator, precise parallel movement.

In the exemplary embodiment illustrated in FIG. 1, this movement will cause at least more or less parallel movement of the two components 2a, 2b in relation to one another in the axial direction. The precise mechanism and the associated possibilities of adjusting the position of the two components 2a, 2b in relation to one another are explained again in more detail further on, in particular in relation to FIGS. 3 to 5.

Figure 2:
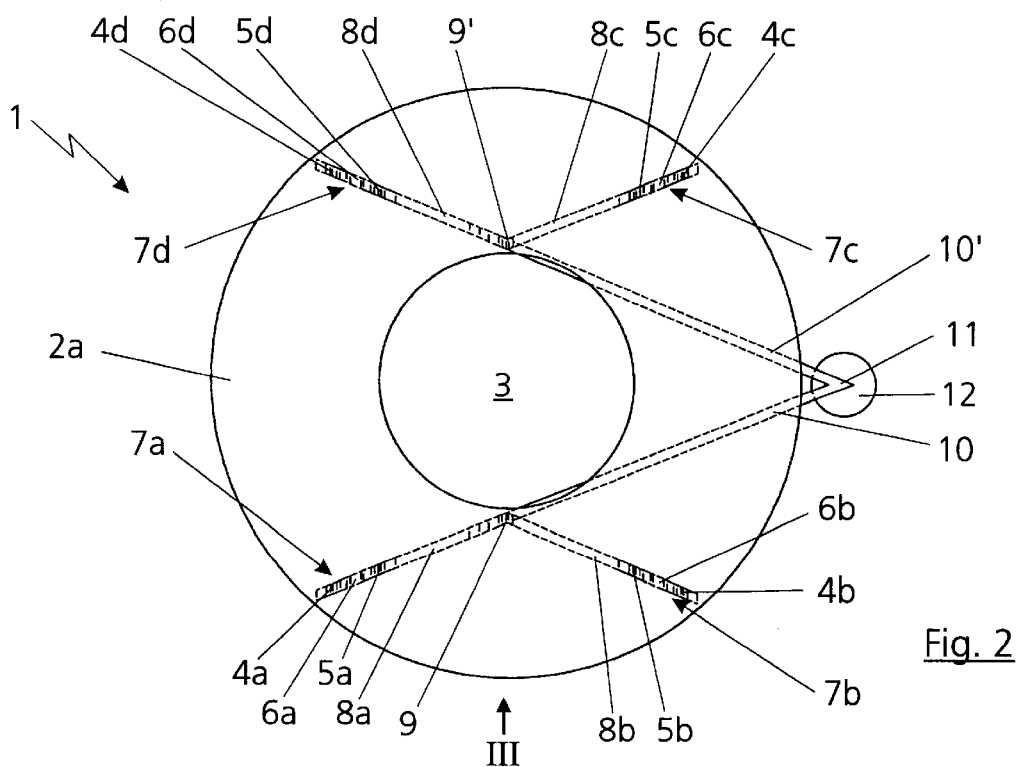
FIG. 2 shows a plan view of the optical element mount according to FIG. 1.

FIG. 2 shows a plan view, according to the arrow II in FIG. 1, of the optical element mount 1 for adjusting the axial position of the two components 2a, 2b in relation to one another. In this case, FIG. 2 shows a construction which is ideal for the functioning of the optical element mount 1, and in which the hinges 4a, 5a, the further hinge 9 and the point of connection 11 as well as the hinges 4d, 5d, the further hinge 9' and the point of connection 11 are respectively arranged in alignment. By the action of force at the point of connection 11, it is thus possible to achieve ideal activation of the optical element mount 1. The adjustment of the position of the two components 2a, 2b in relation to one another may thus take place via a single actuator 12 (only indicated here in basic form), which applies the force F and may be configured, for example, as an electromagnetic element, hydraulic element or as a piezzoelement.

The optical element mount 1 is configured with flexure hinges as hinges 4a, 4b, 4c, 4d and 5a, 5b, 5c, 5d and 9 and 9'. This makes it possible for the optical element mount 1 as a whole, with the exception of the point of connection 11 in the region of the lever-like extensions 10, 10', to be of monolithic configuration. This means that the entire optical element mount 1 may be produced from a single part, a recommended production process here being a combination of machining by cutting and by erosion. The comparatively long lever-like extensions 10, 10' make it possible to realize a comparatively large transmission ratio of the movement of the point of connection 11 or of the actuator 12 to the movement of the individual hinges 4a, 4b, 4c, 4d and 5a, 5b, 5c, 5d. This means, first of all, that, via the comparatively long distance and a relatively small force F at the point of connection 11, it is possible to realize a small movement of the individual hinges 4a, 4b, 4c, 4d and 5a, 5b, 5c, 5d of the respective components 2a, 2b in relation to one another, which, in turn, makes it possible to improve the accuracy of the movement of the two components 2a, 2b in relation to one another with respect to the resolution or accuracy which can be achieved for the movement of the actuator 12 applying the force F at the point of the connection 11. Moreover, it is therefore possible for the hinges 4a, 4b, 4c, 4d; 5a, 5b, 5c, 5d and 9, 9', configured as flexure hinges, to be a very rigid configuration since, on account of the comparatively long lever length of the lever-like extensions 10, 10', it is sufficient to have a comparatively small force F at the point of connection 11 in order to move the very rigid flexure hinges. This, in turn, makes it possible for the optical element mount 1 as a whole to be of very rigid configuration, and also makes it possible to realize a correspondingly high eigenfrequency of the optical element mount 1. A possibly occurring minimal change in position of the two components 2a, 2b in relation to one another, by the external action of force and undesired oscillations, may thus be reduced.

The very long possible configuration of the lever-like extensions 10, 10' produces a very small angle of rotation of the hinges over a given distance of the actuator. As a result, the desired Z movement, which is described by the sine of this angle of rotation, thus corresponds more or less to the angle of rotation itself. The undesired movement in the direction transverse thereto is described by the cosine and, under the above mentioned conditions, it thus remains very small.

In addition to the lever-like extensions 10, 10' being respectively arranged in alignment with the hinges 4a, 5a and 9 and 4d, 5d and 9', this arrangement being illustrated here, it is also, of course, conceivable to have other embodiments. The lever-like extensions 10, 10' may then be connected via a further transverse lever or the like (not illustrated). However, this involves the acceptance of additional bending movements or the like, which may possibly reduce the accuracy of the optical element mount which it is possible to achieve. It would also be conceivable, in principle, to arrange, on each of the lever-like extensions 10, 10', a dedicated actuator 12 for producing the necessary force F. However, the construction with just a single actuator, which acts at a point of connection 11 or, as appropriate, also indirectly on this point of connection 11 via further lever elements, eliminates the regulating outlay between a plurality of actuators. Space is saved, and the regulation/control of the optical element mount 1 is simplified, by the use of just a single actuator 12.

In addition to the monolithic or at least partly monolithic construction of the optical element mount 1 which has been mentioned here, a partially monolithic configuration of the optical element mount 1 is also conceivable, so that said optical element mount could be assembled, for example, from at least two monolithically produced parts. Moreover, a variation in the position of the individual pairs of hinges 7a, 7b, 7c, 7d in relation to one another and the profile of the lever-like extensions 10, 10' make it possible to achieve an arrangement in which the central opening 3 may be of correspondingly larger design if the optical elements used, for example lenses, render this necessary. On account of the rigidity which has to be achieved, with already comparatively small flexure hinges, this does not constitute any problem. On the other hand, if use is made of optical elements which act as reflectors, that is to say, for example, mirror elements or the like, it is possible to dispense with the central opening 3 altogether, which allows additional flexibility in terms of the arrangement of the hinges 4a, 4b, 4c, 4d and 5a, 5b, 5c, 5d and of the levers 8a, 8b, 8c, 8d.

Figure 3:
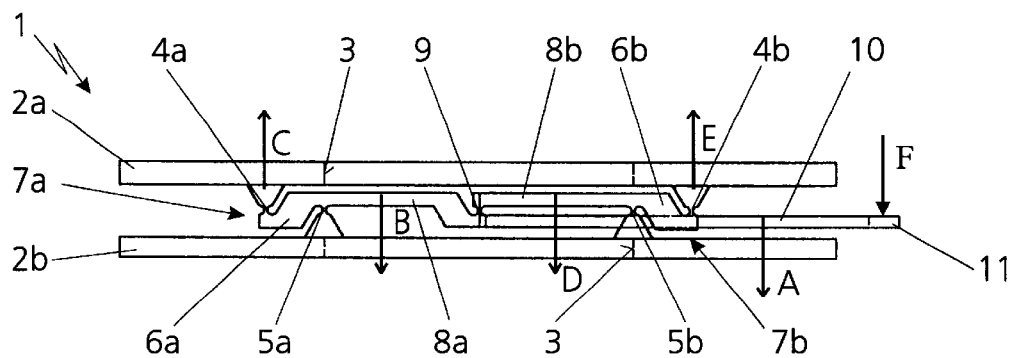
FIG. 3 shows a side view of the optical element mount according to FIG. 1.

FIG. 3, then, shows the optical element mount 1 as a Z manipulator in a side view according to the arrow III in FIG. 2. The individual elements here are located, in part, congruently one behind the other, so that it is only the elements which can be seen in each case which are designated in FIG. 3, and in the following figures, although the construction which can be seen in the illustration is present in double form.

In FIG. 3, the optical element mount 1 serves for the Z manipulation of the two components 2a, 2b. Acting at point of connection 11 is the force F, which, in the exemplary embodiment illustrated, deflects the lever-like extension 10 downward. The force F, or at least one of the force components thereof, acts in the direction of the desired manipulation.

By virtue of the force F, then, as has already been mentioned, the lever-like extension 10 is thus deflected downward according to the arrow A. This causes a likewise downwardly directed deflection of the lever 8a according to the arrow B. The rotation, caused by the lever 8a, of the lever element 6a and the lever 8a about the hinge 5a results in the hinge 4a moving upward according to the arrow C. At the same time, the lever 8b is likewise drawn downward according to the arrow D via the further hinge 9. This too results in the rotation of the lever 8b and of the lever element 6b about the hinge 5b. Accordingly, the hinge 4b is moved upward according to the arrow E. The action of the force F on the point of connection 11 in the direction illustrated here thus results in the two components 2a, 2b moving relative to one another. In the exemplary embodiment illustrated here, this relative movement takes place as the two components 2a, 2b moving away from one another in parallel. Of course, with a conversely acting force F, it is also possible for the two components to be moved toward one another.

Figure 4:
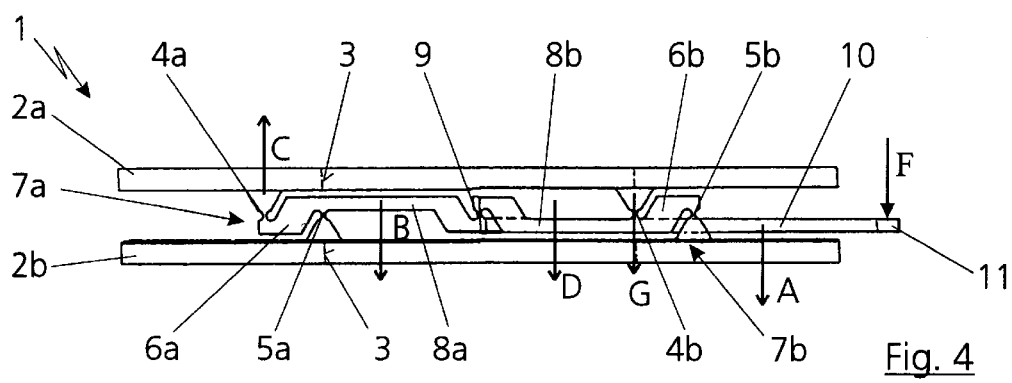
FIG. 4 shows a side view of the optical element mount, in a manner analogous to FIG. 3, in an alternative embodiment.

In FIG. 4, it is possible to see a basically comparable side view of the optical element mount 1 embodied as a tilting-type or angle manipulator. All that has been changed here is the arrangement of the hinges 4b and 5b in relation to one another. This also applies, of course, to the hinges 4c and 5c, which cannot be seen here and are arranged congruently behind the hinges 4b and 5b. In this case, in respect of the further hinge 9, the hinges 4a, 4b which are to be assigned to the component 2a, are arranged in the same direction in each case in relation to the hinges 5a, 5b, which are assigned to the component 2b. This means that in relation to FIG. 3, in which the hinges assigned to the component 2a are arranged on the outside in each case in respect of the further hinge 9, the hinges 4a, 4b in FIG. 4 are arranged to the left in each case.

With the same functioning, that is to say the action of force on the point of connection 11 from above, the result is thus also, once again, a deflection of the lever-like extension 10 in the downward direction according to the arrow A. This too, in turn, causes a deflection of the lever 8a in the downward direction, which, in the manner which has already been described above, causes a deflection of the hinge 4a in the upward direction according to the arrow C. It is also the case that the lever element 8b, in a manner analogous to the movement explained in relation to FIG. 3, is deflected downward according to the arrow D. The different arrangement of the hinges 4b, 5b of the pair of hinges 7b here, however, results in a rotation of the lever 8b and of the lever element 6b about the hinge 5b such that, in this case, the hinge 4b is deflected downward according to the arrow G.

The action of force on the point of connection 11 in the case of that arrangement of the hinges 4b, 5b of the pair of hinges 7b which is illustrated in FIG. 4 thus results in a tilting movement or angle manipulation of the two components 2a, 2b in relation to one another.

Figure 5:
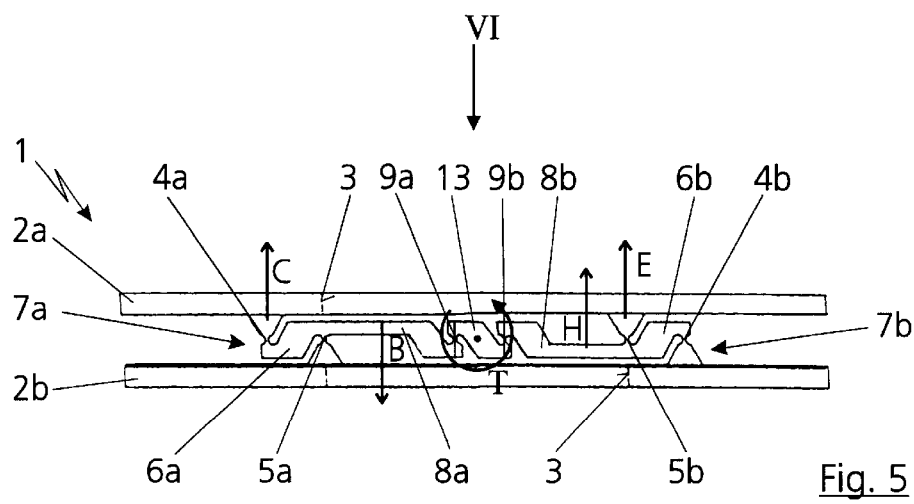
FIG. 5 shows a side view of the optical element mount, in a manner analogous to FIG. 3, in an embodiment for introducing a torque with an additional lever element.

FIG. 5 shows a further possible way of activating such a optical element mount 1 for manipulating the two components 2a, 2b by means of a torque T in relation to one another. In this case, the further hinge 9 has been divided up into two individual hinge points 9a, 9b. Of course, this applies analogously to the further hinge 9', which has likewise been divided up into two hinge points 9a' and 9b' (which cannot be seen here). These two hinge points between the levers 8a, 8b are respectively connected via an intermediate lever 13 and an intermediate lever 13', which is concealed behind the intermediate lever 13. In the region of the further hinge 9', which is concealed here, a torque T acts on the intermediate levers 13, 13', around the region of the hinges 9, 9', as a torsional moment.

This torque T, which in the exemplary embodiment illustrated here acts in the counter clockwise direction, although it can obviously act in the opposite direction in a manner analogous to the above described forces F in order to change the direction of the manipulation, results in the lever 8a moving downward according to the arrow B. This movement of the lever 8a, in the downward direction according to the arrow B, causes, in the manner which is already known, a movement of the hinge 4a in the upward direction according to the arrow C. Moreover, the torque T results in a movement of the lever 8b in the upward direction according to the arrow H. As a result, the lever 8b, together with the lever element 6b, is moved about the hinge 4b such that a movement of the hinge 5b in the upward direction according to the arrow E is produced. The construction according to FIG. 5, which, with the arrangement of its hinges 4a, 4b on the component 2a in relation to the hinges 5a, 5b on the component 2b, is constructed analogously to the exemplary embodiment in FIG. 4, thus causes during usage, by way of the torque T, a parallel displacement of the two components 2a, 2b in relation to one another, and, accordingly, may be utilized as a Z manipulator.

Figure 6:
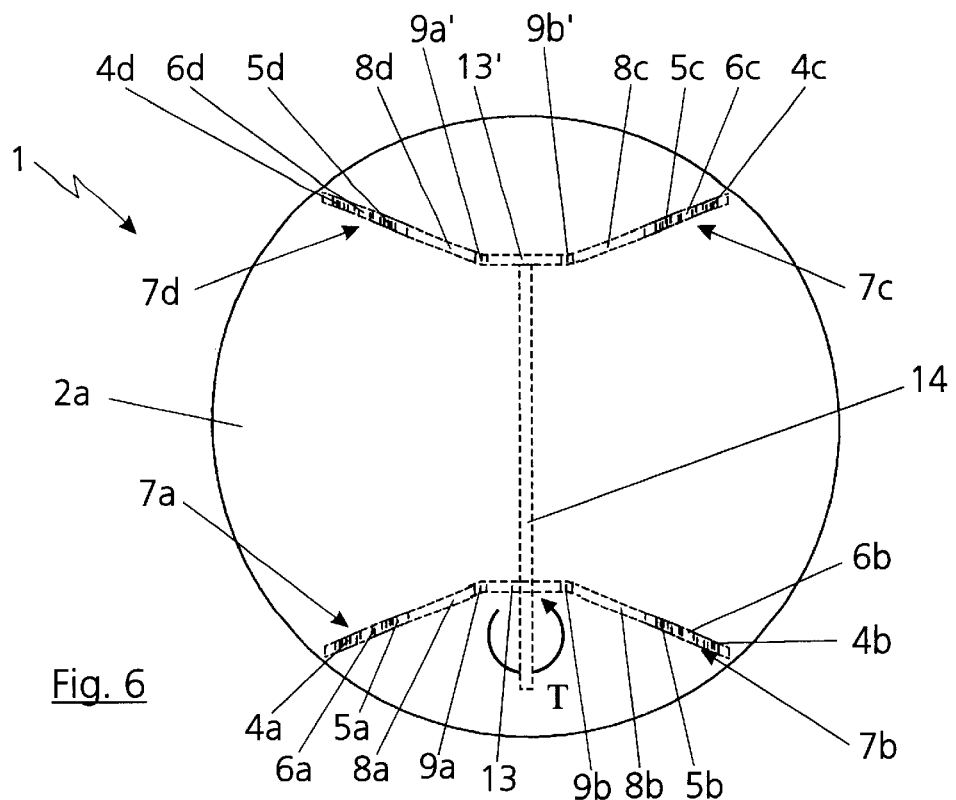
FIG. 6 shows a plan view of the optical element mount according to the arrow VI in FIG. 5.

FIG. 6, then, shows in a further plan view of the optical element mount 1, in an illustration analogous to FIG. 2, a possibility of allowing the torque T to act uniformly on the two hinges 9, 9'. For this purpose, use is made, in the exemplary embodiment illustrated here, of a spindle 14 which connects the two further hinges 9, 9' to one another. Of course, such a construction is only conceivable for an optically non-transparent element on the component 2a or the components 2a, 2b since the spindle 14, for ideal functioning, would otherwise run in the region of the central openings 3.

Figure 7:
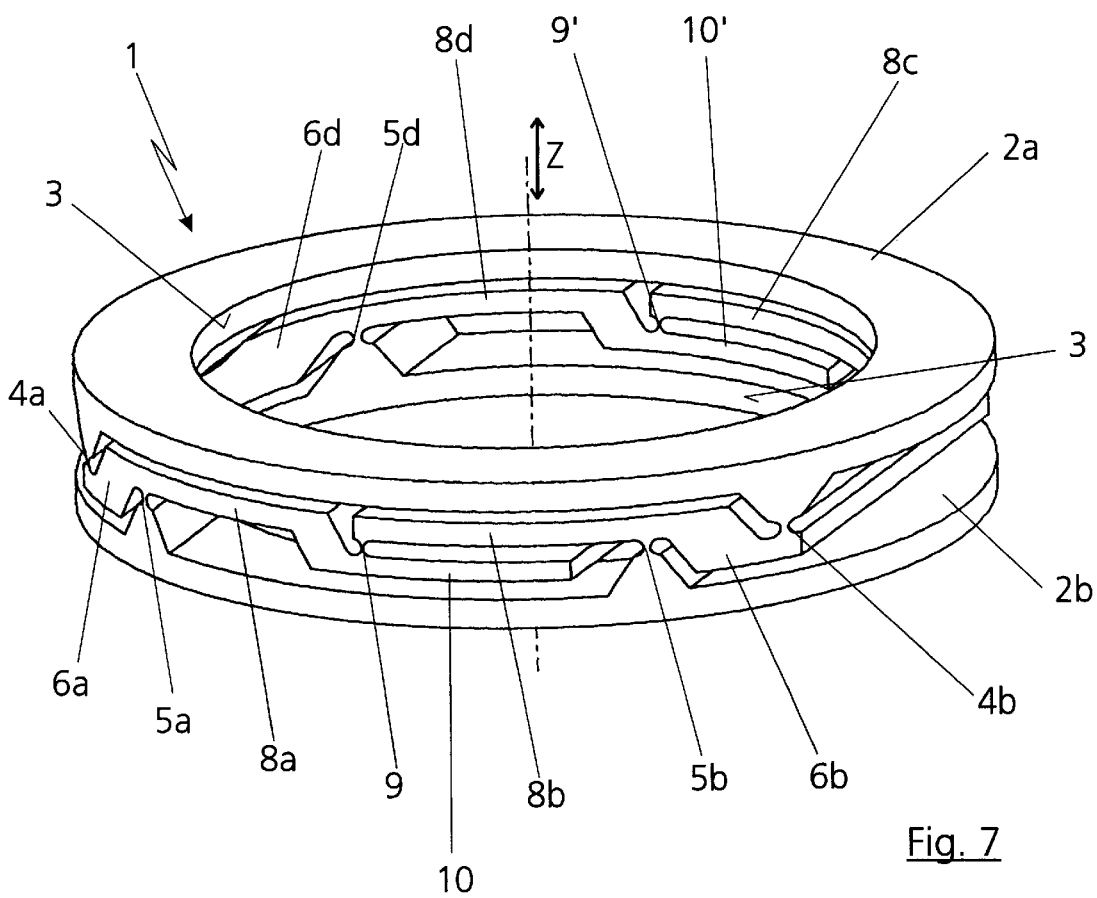
FIG. 7 shows a three-dimensional illustration of an embodiment of the optical element mount which functions in a manner analogous to FIG. 1.

FIG. 7 shows a further exemplary embodiment of the optical element mount 1, which in this case is illustrated as a Z manipulator operated via the action of force. This Z manipulator allows a central opening 3 with a very large opening diameter. This achieves a very compact construction of the optical element mount 1 for the Z manipulation of the two components 2a, 2b in relation to one another. Since the hinges 4a, 4b, 4c, 4d, 5a, 5b, 5c, 5d and 9 and 9' are designed as comparatively wide flexure hinges, the optical element mount 1 according to the exemplary embodiment in FIG. 9 achieves, alongside a very high level of compactness, also a very high level of rigidity.

Figure 8:
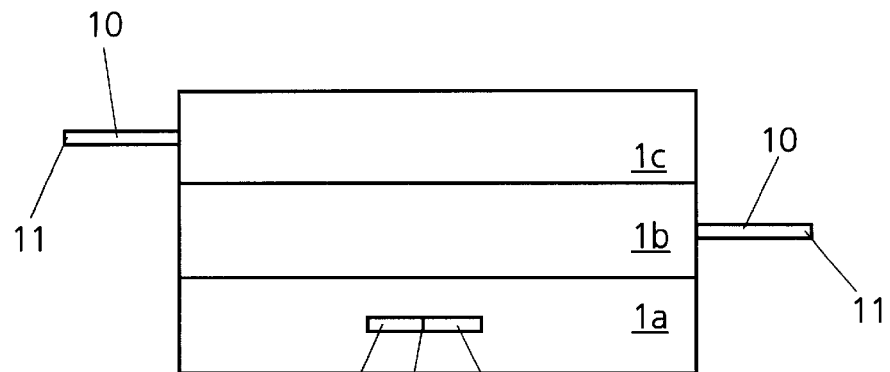
FIG. 8 shows a basic schematic illustration of a combination of three optical element mounts.

FIG. 8 shows a schematic construction which makes it possible, in this case by means of three of the optical element mounts 1, to realize a wide range of manipulations. Three of the optical element mounts 1 are arranged one above the other here and are each actuated via the action of force in the lever-like extensions 10, 10' and/or the points of connection 11. In this case, a first optical element mount 1a is designed as a Z manipulator. This optical element mount 1a has arranged on it a further optical element mount 1b, which is designed as an angle manipulator. A third optical element mount 1c, which is arranged on the optical element mount 1b, is likewise designed as an angle manipulator, and in this case is arranged in a state in which it has been rotated through at least more or less 90° in relation to the optical element mount 1a. Of course, all other angles other than 0° and 180° are conceivable in principle, although with a rotation through approximately 90°, it is possible to adjust the angles from both directions independently of one another.

With such a stack of three optical element mounts 1a, 1b, 1c, it is thus possible to realize, via at least three single actuators 12 (not illustrated here), a manipulation of the two outermost components of the stack in all angle positions and axial spacings. Of course, other arrangements are also conceivable here.

Figure 9:
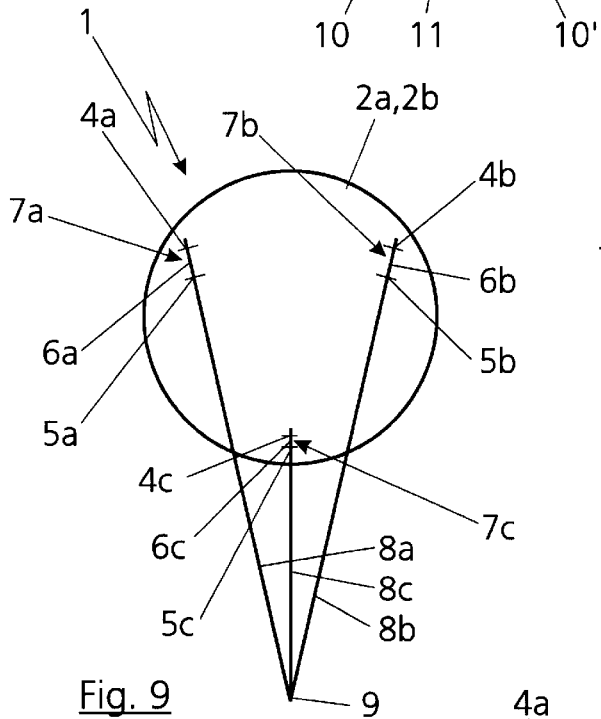
FIG. 9 shows a schematic illustration of an embodiment of the optical element mount with three pairs of hinges.

FIG. 9 shows an embodiment of the optical element mount 1 in a schematic illustration with three pairs of hinges 7a, 7b, 7c, three lever elements 6a, 6b, 6c and three levers 8a, 8b, 8c. The three levers 8a, 8b, 8c come together at a hinge 9, which in this case is arranged outside the two carrier elements 2a, 2b. An actuator 12 (not illustrated here) may act directly, or via further lever elements, in the region of the further hinge 9 in order to move the two carrier elements 2a, 2b in relation to one another. On account of the different lever lengths between the two levers 8a, 8b, which in this case are configured to be of the same length, and the shorter lever 8c, it is necessary for the length of the lever elements 6a, 6b and 6c to be adapted to correspond to these lengths of the levers 8a, 8b and 8c, respectively, in order to continue to ensure parallel movement of the two carrier elements 2a, 2b in relation to one another. Of course, a tilting movement should also be conceivable here since, here too, the hinges 4a, 4b, 4c and 5a, 5b, 5c could be arranged in each case to correspond to the exemplary embodiments which have already been explained. In order to realize a, for example, parallel movement, the construction according to FIG. 9 requires a somewhat higher level of production outlay since the transmission ratios of the individual levers 8a, 8b, 8c and lever elements 6a, 6b, 6c have to be adapted in a correspondingly precise manner. However, the three points of contact between the two carrier elements 2a, 2b result, on the three pairs of hinges 7a, 7b, 7c, in a statically determined system with the corresponding, favorable effects.

Figure 10:
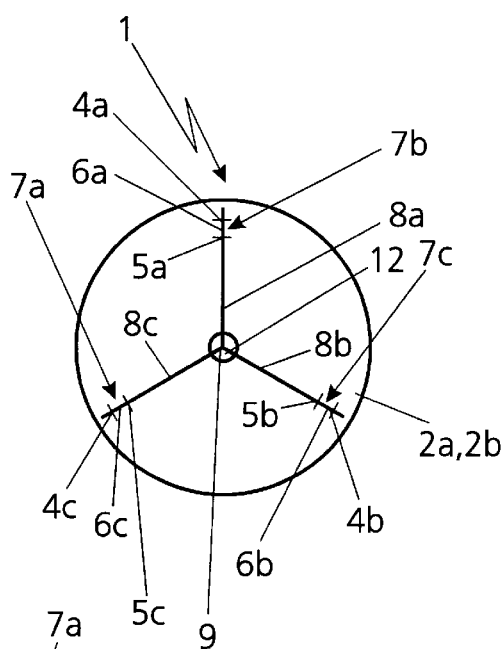
FIG. 10 shows a schematic illustration of an alternative embodiment of the optical element mount with three pairs of hinges.

FIG. 10 also shows a corresponding construction with three pairs of hinges 7a, 7b, 7c in a likewise very highly schematic illustration. In this case, the three levers 8a, 8b, 8c come together in the region of the optical axis or Z-axis. This construction, in turn, makes it possible to use three correspondingly similarly designed levers in order to realize the parallel movement. It is thus possible to reduce the production outlay in the case of an again statically determined system. On account of the arrangement of the hinge 9 and of the actuator 12, which is arranged in the region of the hinge 9, this construction is recommended, in particular, for manipulating an optically non-transparent element, for example a mirror, which is to be manipulated axially on its carrier element 2a in relation to a base element or a carrier element 2b.

Figure 11:
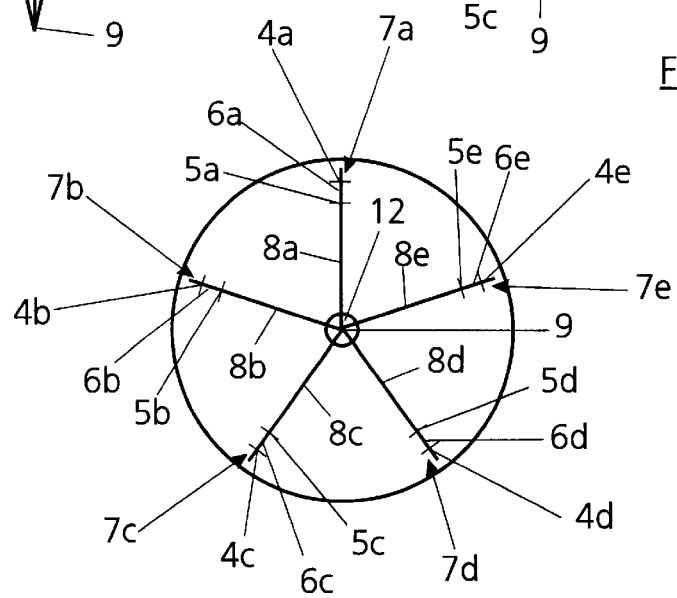
FIG. 11 shows a schematic illustration of a further embodiment of the optical element mount with numerous pairs of hinges.

FIG. 11 shows a construction which is comparable to that in FIG. 10, although in this case, instead of the three pairs of hinges 7a, 7b, 7c from FIG. 10, five pairs of hinges 7a, 7b, 7c, 7d, 7e with their corresponding levers 8a, 8b, 8c, 8d, 8e come together at the hinge 9 in the region of the actuator 12.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An optical element mount comprising an optical element holding frame, a mount stack frame, comprising three or more levers connected by a hinge to said optical element holding frame, by another hinge to said mount stack frame, by a third hinge to another of said levers.

2. The optical element mount as claimed in claim 1, wherein each of the hinges of said optical element holding frame being connected to the corresponding hinge, of the said mount stack frame by a lever to form a pair of hinges, each of the pairs of hinges being connected to at least one lever of one of the adjacent pairs of hinges by at least one lever and at least one of the said third hinge.

3. The optical element mount as claimed in claim 1, wherein an action of force is provided on at least one lever-like extension of at least one of the levers.

4. The optical element mount as claimed in claim 1, wherein the said third hinges are connected to one another by a spindle.

5. The optical element mount as claimed in claim 3, wherein a torque is acting on the spindle as a torsional moment.

6. The optical element mount as claimed in claim 1, comprising flexure joints.

7. The optical element mount as claimed in claim 3, wherein said pairs of hinges, said levers, said optical element holding frame, said mount stack frame, and said lever-like extensions are of at least partially monolithic design.

8. The optical element mount as claimed in claim 1, wherein the action of force is provided by a single actuator.

9. The optical element mount as claimed in claim 7, wherein the said actuator is arranged at least more or less in a region of an optical axis of the optical element mount.

10. The optical element mount as claimed in claim 2, wherein the hinges of each of the pairs of hinges are arranged such that the said hinges being located on said optical element holding frame, are arranged on that side of the pair of hinges which is directed toward the at least one third hinge, and the hinges of the respective pair of hinges, being located on said mount stack frame, are arranged on that side of the pair of hinges which is directed away from the at least one third hinge.

11. The optical element mount as claimed in claim 2, wherein the hinges of each of the pairs of hinges are arranged such that the said hinges being located on said mount stack frame, are arranged on that side of the pair of hinges which is directed toward the at least one third hinge, and the hinges of the respective pair of hinges, being located on said optical element holding frame, are arranged on that side of the pair of hinges which is directed away from the at least one third hinge.

12. The optical element mount as claimed in claim 2, wherein the hinges of each of the pairs of hinges are arranged such that the said hinges being located on said optical element holding frame, are arranged on the same side of the pair of hinges, in respect of the at least one third hinges, and the hinges of the respective pair of hinges, being located on said mount stack frame, are arranged on the other side of the pair of hinges, in respect of the at least one third hinge.

13. The optical element mount as claimed in claim 2, wherein the hinges of each of the pairs of hinges are arranged such that the said hinges being located on said mount stack frame, are arranged on the same side of the pair of hinges, in respect of the at least one third hinges, and the hinges of the respective pair of hinges, being located on said optical element holding frame, are arranged on the other side of the pair of hinges, in respect of the at least one third hinge.

14. The optical element mount as claimed in claim 1, wherein it is designed as a Z-manipulator for the parallel adjustment of the axial spacing between the optical element holding frame and the mount stack frame.

15. The optical element mount as claimed in claim 1, wherein the levers are designed to be of the same length.

16. The optical element mount as claimed in claim 1, wherein it is designed as a tilting-type manipulator for adjusting the angle position of the optical element holding frame and the mount stack frame in relation to one another.

17. The optical element mount as claimed in claim 16, wherein the levers are coordinated with one another in terms of length such that one tilting axis of the tilting-type manipulator intersects the Z-axis.

18. An optical arrangement comprising at least two optical elements arranged in at least two optical element mounts according to claim 1, having an optical axis, the devices being arranged in a positional relationship such that a second of said devices is rotated about said optical axis relatively to a first of said devices by an angle substantially different from 0° and 180°.

19. The optical arrangement as claimed in claim 18, wherein the at least one of the optical element mounts is arranged in a state in which it has been rotated about the optical axis at an angle of 90°.

20. Adjusting device for the position of two holding components for optical elements, wherein the components are adjustable in relation to one another, wherein each of the components has at least three hinges, each of the hinges of one component being connected to a corresponding hinge of the respectively other component by a lever element to form a pair of hinges, each of the pairs of hinges being connected to at least one lever of at least one of the adjacent pairs of hinges by the at least one lever and at least one further hinge.

21. The adjusting device as claimed in claim 20, wherein said holding components are holding frames for a lens or a mirror as manipulators for microlithography.

* * * * *

UNITED STATES PATENT AND TRADEMARK OFFICE
CERTIFICATE OF CORRECTION

PATENT NO.     : 6,538,829 B2
DATED          : March 25, 2003
INVENTOR(S)    : Johannes Rau et al.

It is certified that error appears in the above-identified patent and that said Letters Patent is hereby corrected as shown below:

Column 1,
Line 15, replace "U.S. Pat. No. 5,822,133 discloses a optical element mount" with
-- U.S. Pat. No. 5,822,133 discloses an optical element mount --
Line 58, replace "The object of the invention is to provide a optical element" with
-- The object of the invention is to provide an optical element --

Column 6,
Lines 62-63, replace "a further possible way of activating such a optical element" with
-- a further possible way of activating such an optical element --

Signed and Sealed this

Eighteenth Day of November, 2003

JAMES E. ROGAN
*Director of the United States Patent and Trademark Office*